United States Patent
Huebl et al.

(10) Patent No.: US 11,342,953 B2
(45) Date of Patent: May 24, 2022

(54) CONTROLLER DEVICE FOR A MOTOR VEHICLE, AND MOTOR VEHICLE

(71) Applicant: Robert Bosch GmbH, Stuttgart (DE)

(72) Inventors: Jochen Huebl, Schwieberdingen (DE); Peter Kralicek, Marbach (DE)

(73) Assignee: Robert Bosch GmbH, Stuttgart (DE)

( * ) Notice: Subject to any disclaimer, the term of this patent is extended or adjusted under 35 U.S.C. 154(b) by 21 days.

(21) Appl. No.: 17/054,679

(22) PCT Filed: Apr. 12, 2019

(86) PCT No.: PCT/EP2019/059584
§ 371 (c)(1),
(2) Date: Nov. 11, 2020

(87) PCT Pub. No.: WO2019/233664
PCT Pub. Date: Dec. 12, 2019

(65) Prior Publication Data
US 2021/0367631 A1 Nov. 25, 2021

(30) Foreign Application Priority Data
Jun. 7, 2018 (DE) .......................... 102018209001.7

(51) Int. Cl.
*H04B 1/10* (2006.01)
*B60W 60/00* (2020.01)
*H04B 1/08* (2006.01)
(52) U.S. Cl.
CPC ....... *H04B 1/1027* (2013.01); *B60W 60/0015* (2020.02); *H04B 1/082* (2013.01)

(58) Field of Classification Search
CPC . H04B 1/1027; H04B 1/082; B60W 60/0015; B60W 60/001;
(Continued)

(56) References Cited

U.S. PATENT DOCUMENTS

| | | | | |
|---|---|---|---|---|
| 4,631,473 A | * | 12/1986 | Honda | ............... G01R 29/0814 324/95 |
| 5,501,417 A | * | 3/1996 | Capan | ...................... B61L 3/24 246/63 R |

(Continued)

FOREIGN PATENT DOCUMENTS

| | | |
|---|---|---|
| DE | 19636816 A1 | 3/1998 |
| DE | 19713449 A1 | 10/1998 |

(Continued)

OTHER PUBLICATIONS

International Search Report for PCT/EP2019/059584, dated Aug. 8, 2019.

*Primary Examiner* — Jinsong Hu
*Assistant Examiner* — Rui M Hu
(74) *Attorney, Agent, or Firm* — Norton Rose Fulbright US LLP; Gerard Messina

(57) ABSTRACT

A controller device for a motor vehicle, in particular for an autonomously operable motor vehicle, having a controller for operating the motor vehicle, and a protective device for protecting the controller from electromagnetic interference fields or interfering signals. The protective device has a receiver device for acquiring electromagnetic interference fields or interfering signals, a processing device for providing information about an electromagnetic interference field or interfering signal acquired by the receiver device, and a control unit that evaluates the acquired field and/or interference signal as a function of the acquired information.

18 Claims, 1 Drawing Sheet

(58) Field of Classification Search
CPC .. B60W 2050/0002; B60W 2050/0047; B60R 16/023; B60R 16/0207; G05D 1/0088; G05D 2201/0213
See application file for complete search history.

(56) References Cited

U.S. PATENT DOCUMENTS

| | | | | |
|---|---|---|---|---|
| 5,666,382 | A * | 9/1997 | Thakore | H04L 27/2602 375/349 |
| 5,713,541 | A * | 2/1998 | Schmitz | B60L 9/00 246/182 R |
| 6,061,554 | A * | 5/2000 | Castella | H04B 1/18 330/149 |
| 6,137,992 | A * | 10/2000 | Mohan | H04B 17/20 455/226.1 |
| 7,848,707 | B2 * | 12/2010 | Patel | H04B 15/025 455/67.13 |
| 8,417,208 | B2 * | 4/2013 | Patel | H04B 15/025 455/297 |
| 9,716,529 | B1 * | 7/2017 | Dai | H04L 25/03885 |
| 10,161,985 | B2 * | 12/2018 | Higgins | G01R 31/001 |
| 10,812,119 | B1 * | 10/2020 | Ciacci | H04B 1/10 |
| 11,038,605 | B1 * | 6/2021 | Kerselaers | H04B 1/1009 |
| 2002/0020915 | A1 * | 2/2002 | Fujio | H01L 23/50 257/E23.079 |
| 2002/0075018 | A1 * | 6/2002 | Shimazaki | G01R 31/002 324/762.02 |
| 2004/0059484 | A1 * | 3/2004 | Nakaya | H04B 15/04 307/10.1 |
| 2004/0257275 | A1 * | 12/2004 | Yee | G01S 5/02 342/357.59 |
| 2005/0270115 | A1 * | 12/2005 | Chen | H05K 1/0233 333/12 |
| 2008/0311875 | A1 * | 12/2008 | Jakonen | H04W 16/14 455/295 |
| 2009/0086462 | A1 * | 4/2009 | Funato | H05K 7/1432 361/818 |
| 2009/0186588 | A1 * | 7/2009 | Makela | G01R 31/001 455/226.1 |
| 2009/0243629 | A1 * | 10/2009 | Tang | G01R 29/0878 324/627 |
| 2009/0325495 | A1 * | 12/2009 | LaBerge | H04L 67/12 455/63.1 |
| 2012/0027142 | A1 * | 2/2012 | Essebbar | H04B 1/1027 375/350 |
| 2012/0098591 | A1 * | 4/2012 | Subramanian | H04B 1/12 327/551 |
| 2013/0190973 | A1 * | 7/2013 | Meng | B60K 37/06 701/36 |
| 2013/0229191 | A1 * | 9/2013 | Kandler | G01R 31/28 324/537 |
| 2014/0062502 | A1 * | 3/2014 | Takahashi | G01R 31/001 324/613 |
| 2014/0107860 | A1 * | 4/2014 | Bugno | G01C 17/38 702/92 |
| 2015/0051831 | A1 * | 2/2015 | Hibbard, Jr. | H04B 1/123 701/468 |
| 2016/0259432 | A1 * | 9/2016 | Bau | G06F 1/163 |
| 2017/0234916 | A1 * | 8/2017 | Lawlis | G01R 31/007 701/34.4 |
| 2018/0032071 | A1 * | 2/2018 | Wieneke | G05D 1/0038 |
| 2018/0269869 | A1 * | 9/2018 | Mukhopadhyay | H02M 1/08 |
| 2019/0128937 | A1 * | 5/2019 | Choi | G01R 29/0814 |
| 2019/0235086 | A1 * | 8/2019 | Meng | G05D 1/0061 |
| 2019/0384313 | A1 * | 12/2019 | Toth | G05D 1/0246 |
| 2019/0393913 | A1 * | 12/2019 | Hivert | H04L 27/06 |
| 2020/0096621 | A1 * | 3/2020 | Geske | H04B 10/40 |
| 2021/0080495 | A1 * | 3/2021 | Kajbaf | G01R 29/0871 |
| 2021/0116926 | A1 * | 4/2021 | Inaba | G08G 1/14 |
| 2021/0266721 | A1 * | 8/2021 | Tang | H04B 15/02 |

FOREIGN PATENT DOCUMENTS

| | | |
|---|---|---|
| DE | 102011084942 A1 | 4/2013 |
| DE | 102017006979 A1 | 1/2018 |

* cited by examiner

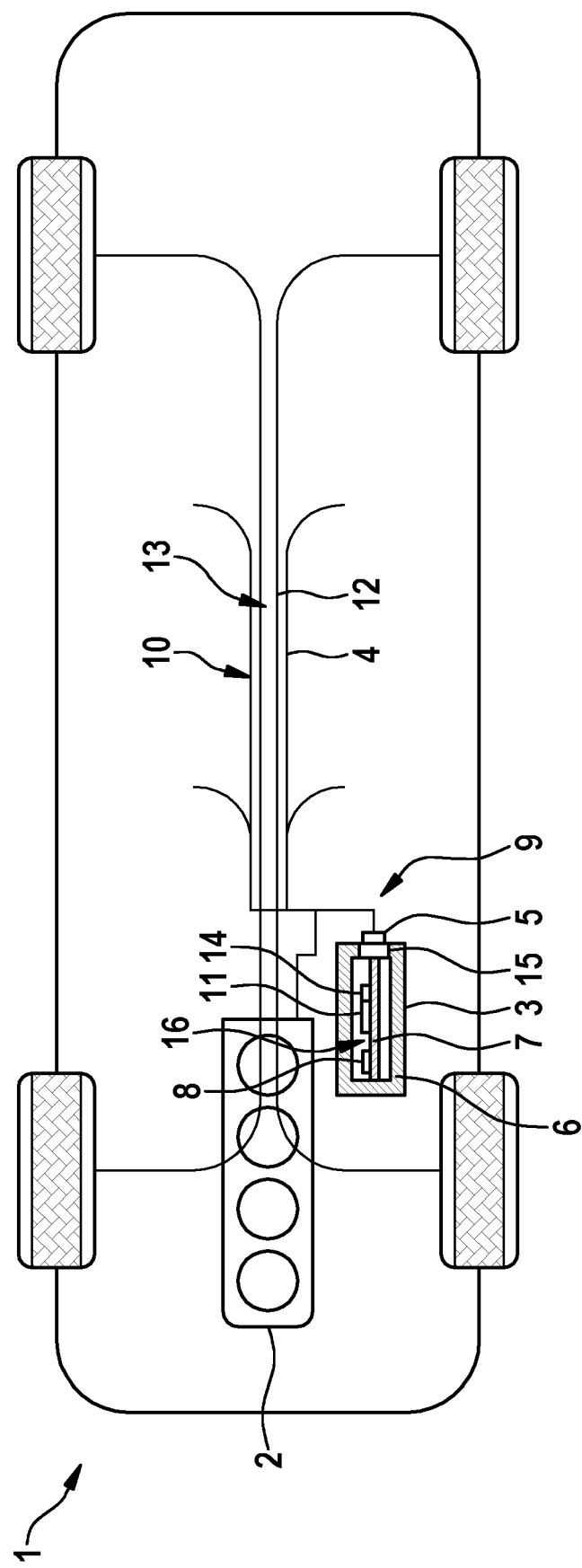

CONTROLLER DEVICE FOR A MOTOR VEHICLE, AND MOTOR VEHICLE

FIELD

The present invention relates to a controller device for a motor vehicle, in particular for an autonomously operable motor vehicle, having a controller for operating a motor vehicle and having a protective device for protecting the controller from electromagnetic interference fields and/or interfering signals.

In addition, the present invention relates to a motor vehicle having such a controller device.

BACKGROUND INFORMATION

Today's controllers are secured and tested in the design and construction phase with regard to their susceptibility to interference or influencing by electromagnetic radiation. The requirements to be met here result from legal requirements and, in addition, customer requirements. Within these requirements, the controllers must operate without error, or must at least fall back to a safe operating mode. Generally, the requirements are chosen such that they cover most electromagnetic interference fields that occur during operation. In specific cases, such as excessive field levels resulting from the situation of the controller in the motor vehicle and/or at the cable harness, due to the use of less metal in the vehicle body construction, or due to intentional extreme attempts at influencing, electromagnetic interference fields and interfering signals that exceed the required limits may occur. In these situations, the conventional protective devices are not adequately able to also recognize these.

SUMMARY

An example controller device according to the present invention may have the advantage that the controller device is better protected against electromagnetic interference fields, because these can be better recognized, thereby enabling an improved safety reaction. According to the present invention, for this purpose, the protective device has a receiver device for acquiring electromagnetic interference fields, a processing device connected to the receiver device for providing information concerning an electromagnetic interference field acquired by the receiver device, and a control unit that evaluates the acquired interference field as a function of the acquired information. Through the evaluation of the interference field, it is possible to decide whether to introduce safety measures. The separate receiver device securely ensures the acquisition of electromagnetic interference fields. In particular, the receiver device is situated outside a housing of the controller, so that an optimal situation of the receiver device is possible independently of the controller. Instead of an interference field, an interfering signal can also be acquired and evaluated.

Preferably, the controller is designed to introduce a safety measure when an interference field acquired by the receiver device is evaluated as critical by the control unit. Thus, for example, when a critical interference field is acquired, a fallback level of the controller is activated in which the essential basic functions of the controller continue to be ensured, and functions that could react sensitively to the acquired electromagnetic interference field are deactivated or are switched to a safe operating mode. The use of redundancies in connection with other controllers is also possible.

In addition, it is preferably provided that the receiver device has at least one electrical line that extends, at least in segments, along a cable harness of the motor vehicle, as a receive antenna for electromagnetic interference fields, in particular in the lower frequency range. As a result, the receiver device is situated outside the housing of the controller, and enables a better acquisition of electromagnetic interference fields and/or signals. The situation outside the controller in particular enables a large-surface acquisition, and thus an advantageous evaluation.

According to a preferred development of the present invention, the receiver device has at least one line on a circuit board of the controller that encloses a connecting plug of the controller for the cable harness, for magnetic coupling. In this way, at the location at which the controller is electrically connected to the cable harness, through the magnetic coupling possible common mode currents at the cable harness are detected, in particular in the lower frequency range.

In addition, it is preferably provided that the receiver device on the circuit board of the controller has at least one conducting structure that acts as a receive antenna, and that is designed in particular to acquire electromagnetic fields in a higher frequency range. For this purpose, the conductor structure is designed in particular in broadband fashion. Through the combination of a plurality of conductor structures that differ in their position and orientation, a recognition of interference fields from different spatial directions is also possible, as is the determination of the spatial direction from which an interference field is coming.

According to a preferred development of the present invention, the processing device has at least one analog-digital converter. Through the digitization of the signals provided by the receiver device, a simple evaluation of the information is ensured.

Particularly preferably, the analog-digital converter is designed to have frequency-selective sensitivity to radio-frequency interference signals.

According to a preferred development of the present invention, the processing device has, alternatively or in addition, a radio-frequency circuit for evaluating the signal provided by the receiver device. The radio-frequency circuit is costly in comparison with the analog-digital converter, but it is suitable for generating a measurable analog voltage from the radio frequency, for example using a logarithmizing unit.

In addition, it is further provided that the control unit has at least one microcontroller. The microcontroller is used in particular to evaluate the information provided by the processing device; this information can be optionally preprocessed and filtered in order to evaluate the information, or the acquired interference field or signal. As stated above, as a function of the evaluation the control unit may introduce one or more safety measures.

An example motor vehicle according to the present invention includes the controller device according to the present invention. The advantages described above may result therefrom.

Further advantages and preferred features and combinations of features result in particular from the above description herein. Below, the present invention is explained in more detail on the basis of the FIGURE.

BRIEF DESCRIPTION OF THE DRAWING

FIG. 1 shows a motor vehicle having an advantageous controller device, in a simplified representation.

DETAILED DESCRIPTION OF EXAMPLE EMBODIMENTS

FIG. 1 shows, in a simplified representation, a motor vehicle 1 that has a drive device 2 that is connected to the drive wheels of the motor vehicle, a controller 3 for operating the motor vehicle and in particular drive device 2, and a cable harness 4 that connects controller 3, electrically and in terms of signals, to drive device 2 and to further electrical/electronic components of motor vehicle 1, such as sensors, cooling or heating devices, lighting devices, safety devices, or the like.

Controller 3 has a connecting plug 5 by which it is connected to cable harness 4 electrically and in terms of signals. Controller 3 has a housing 6 in which there is situated at least one circuit board 7 on which there is situated at least one control unit 8, in particular in the form of a microcontroller.

Moreover, a protective device 9 is allocated to controller 3, the protective device acting to improve the operational safety of controller 3 when electromagnetic interference occurs.

Protective device 9 has a receiver device 10, a processing device 11, and control unit 8. According to the present exemplary embodiment, receiver device 10 has an electrical line 12 that extends from controller 3 along cable harness 4 and forms a receive antenna 13 for electromagnetic interference fields in the lower frequency range. Line 12 is electrically coupled to processing device 11 by connecting plug 5. Processing device 11 has in particular an analog-digital converter 14 that in particular has a frequency-selective sensitivity to radio-frequency interference signals, which can be exploited at low cost for the purpose of recognizing electromagnetic fields. In particular a corresponding pre-circuit of analog-digital converter 14, for example having a bias voltage set to "high" or "low," results in a targeted exploitation of the asymmetrical input characteristic curve of the analog-digital converter, and thus in the signal generation and recognition.

Control unit 8, in particular the microcontroller described above, is designed to evaluate the digital information provided by processing device 11, and to evaluate an electromagnetic interference field or signal acquired by receive antenna 13, and in particular to decide whether it is to be evaluated as critical. If this is the case, then the control unit initiates at least one safety measure, which for example brings it about that controller 3 is switched to a safe operating mode that is not sensitive to electromagnetic interference. Optionally, the control unit sends a warning signal to a user of the motor vehicle, or to other controllers, and/or stores the result for later evaluation in a memory of controller 3.

Alternatively or in addition to line 12, receiver device 10 has an electrical line 15 embedded on circuit board 7 that surrounds connecting plug 5, and thus, via magnetic coupling, detects possible common mode currents on cable harness 4, in particular in a lower frequency range, and thereby also acquires electromagnetic fields acting on cable harness 4. Alternatively or in addition, receiver device 10 has at least one conductor structure 16 integrated on circuit board 7 that acts in broadband fashion, as an integrated receive antenna, for the acquisition of interference in higher frequency ranges. Through the combination of a plurality of conductor structures 16 having various positions and orientations, a recognition of interference fields from different spatial directions is thus also ensured.

Alternatively to analog-digital converter 14, it is also possible to realize processing device 11 having a radio-frequency circuit that is suitable to generate a measurable analog voltage from the radio frequency, for example using a logarithmizing unit.

During the standard EMV release measurement, the circuit parts and filter thresholds of protective device 10 can be calibrated in such a way that, in accordance with specifications, they do not yet respond to electromagnetic influencing, and thus enable a detection of interference outside the specified parameters/requirements.

What is claimed is:

1. A controller device for a motor vehicle, comprising:
    a controller to operate the motor vehicle; and
    a protective device to protect the controller from electromagnetic interference fields or interfering signals, wherein the protective device includes a receiver device configured to acquire an electromagnetic interference field and/or interfering signal, a processing device configured to provide information about the electromagnetic interference field and/or interfering signal acquired by the receiver device, and a control unit configured to evaluate the acquired field and/or interference signal as a function of the provided information;
    wherein the receiver device has at least one electrical line on a circuit board of the controller, the electrical line enclosing a connecting plug of the controller for a cable harness of the motor vehicle for a magnetic coupling.

2. The controller device as recited in claim 1, wherein the motor vehicle is an autonomously operable motor vehicle.

3. The controller device as recited in claim 1, wherein the control unit is configured to introduce at least one safety measure when the acquired interference field and/or interfering signal is evaluated as critical.

4. The controller device as recited in claim 1, wherein the receiver device has at least one electrical conductor that extends at least in segments along the cable harness of the motor vehicle as a receive antenna for the electromagnetic field and/or interfering signal.

5. The controller device as recited in claim 1, wherein the receiver device is on a circuit board of the controller and has at least one conductor structure acting as a receive antenna.

6. The controller device as recited in claim 1, wherein the processing device includes at least one analog-digital converter.

7. The controller device as recited in claim 6, wherein the analog-digital converter has a frequency-selective sensitivity.

8. The controller device as recited in claim 1, wherein the processing device has a radio-frequency circuit.

9. The controller device as recited in claim 1, wherein the control unit includes at least one microcontroller.

10. A motor vehicle, comprising:
    a controller device including:
        a controller to operate the motor vehicle; and
        a protective device to protect the controller from electromagnetic interference fields or interfering signals, wherein the protective device includes a receiver device configured to acquire an electromagnetic interference field and/or interfering signal, a processing device configured to provide information about the electromagnetic interference field and/or interfering signal acquired by the receiver device, and a control unit configured to evaluate the acquired field and/or interference signal as a function of the provided information;

wherein the receiver device has at least one electrical line on a circuit board of the controller, the electrical line enclosing a connecting plug of the controller for the cable harness for a magnetic coupling.

11. The motor vehicle as recited in claim 10, wherein the motor vehicle is an autonomously operable motor vehicle.

12. The motor vehicle as recited in claim 10, wherein the control unit is configured to introduce at least one safety measure when the acquired interference field and/or interfering signal is evaluated as critical.

13. The motor vehicle as recited in claim 10, wherein the receiver device is on a circuit board of the controller and has at least one conductor structure acting as a receive antenna.

14. The motor vehicle as recited in claim 10, wherein the processing device includes at least one analog-digital converter.

15. The motor vehicle as recited in claim 14, wherein the analog-digital converter has a frequency-selective sensitivity.

16. The motor vehicle as recited in claim 10, wherein the processing device has a radio-frequency circuit.

17. The motor vehicle as recited in claim 10, wherein the control unit includes at least one microcontroller.

18. The motor vehicle as recited in claim 10, wherein the receiver device has at least one electrical conductor that extends at least in segments along a cable harness of the motor vehicle as a receive antenna for the electromagnetic field and/or interfering signal.

* * * * *